(12) United States Patent
Auerbach et al.

(10) Patent No.: US 8,938,725 B2
(45) Date of Patent: *Jan. 20, 2015

(54) TECHNIQUE FOR COMPILING AND RUNNING HIGH-LEVEL PROGRAMS ON HETEROGENEOUS COMPUTERS

(75) Inventors: Joshua S. Auerbach, Ridgefield, CT (US); David F. Bacon, Sleepy Hollow, NY (US); Perry S. Cheng, Cambridge, MA (US); Rodric Rabbah, Yonkers, NM (US)

(73) Assignee: International Business Machines Corporation, Armonk, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/618,523

(22) Filed: Sep. 14, 2012

(65) Prior Publication Data

US 2013/0036409 A1 Feb. 7, 2013

Related U.S. Application Data

(63) Continuation of application No. 13/196,300, filed on Aug. 2, 2011, now Pat. No. 8,789,026.

(51) Int. Cl.
*G06F 9/44* (2006.01)
*G06F 9/45* (2006.01)

(52) U.S. Cl.
CPC ..................................... *G06F 8/456* (2013.01)
USPC ............................. 717/140; 717/120; 717/151

(58) Field of Classification Search
None
See application file for complete search history.

(56) References Cited

U.S. PATENT DOCUMENTS

| | | | |
|---|---|---|---|
| 6,738,967 B1 | 5/2004 | Radigan | |
| 7,603,663 B2 * | 10/2009 | Wu et al. | 717/151 |
| 7,689,980 B2 * | 3/2010 | Du et al. | 717/140 |
| 7,757,222 B2 * | 7/2010 | Liao et al. | 717/140 |
| 7,793,255 B1 * | 9/2010 | Kawaguchi et al. | 717/120 |
| 8,286,198 B2 * | 10/2012 | Munshi et al. | 717/140 |
| 8,407,322 B1 * | 3/2013 | Sasikumar et al. | 717/140 |
| 8,453,132 B2 * | 5/2013 | Mannarswamy et al. | 717/151 |
| 2003/0028864 A1 | 2/2003 | Bowen | |
| 2003/0033588 A1 | 2/2003 | Alexander | |
| 2004/0154007 A1 * | 8/2004 | Koizumi et al. | 717/151 |
| 2005/0155023 A1 * | 7/2005 | Li et al. | 717/140 |
| 2005/0229140 A1 | 10/2005 | Tsai et al. | |

(Continued)

OTHER PUBLICATIONS

Wolfram, "Heterogeneous Computing in Mathematica 8", 2011 Wolfram Research, Inc., pp. 1-28; <media.wolfram.com/.../heterogeneous-computing-in-mathematica.pdf>.*

(Continued)

*Primary Examiner* — Thuy Dao
*Assistant Examiner* — Ben C Wang
(74) *Attorney, Agent, or Firm* — Scully, Scott, Murphy & Presser, P.C.; Louis J. Percello, Esq.

(57) ABSTRACT

A technique for compiling and running high-level program on heterogeneous computers may include partitioning a program code into two or more logical units, and compiling each of the logical units into one or more executable entities. At least some of the logical units are compiled into two or more executable entities, the two or more executable entities being different compilations of the same logical unit. The two or more executable entities are compatible to run on respective two or more platforms that have different architecture.

10 Claims, 5 Drawing Sheets

(56) References Cited

U.S. PATENT DOCUMENTS

| | | | |
|---|---|---|---|
| 2006/0026578 A1 | 2/2006 | Ramchandran et al. | |
| 2006/0059474 A1* | 3/2006 | Bhansali et al. | 717/151 |
| 2006/0123401 A1 | 6/2006 | O'Brien et al. | |
| 2006/0123404 A1* | 6/2006 | O'Brien et al. | 717/140 |
| 2007/0079303 A1* | 4/2007 | Du et al. | 717/151 |
| 2007/0283324 A1* | 12/2007 | Geisinger | 717/120 |
| 2008/0189690 A1 | 8/2008 | Heifets et al. | |
| 2008/0250360 A1 | 10/2008 | Willis | |
| 2008/0276262 A1* | 11/2008 | Munshi et al. | 717/140 |
| 2009/0158248 A1* | 6/2009 | Linderman et al. | 717/120 |
| 2009/0293047 A1 | 11/2009 | Chen et al. | |
| 2009/0293048 A1 | 11/2009 | Chen et al. | |
| 2010/0235811 A1 | 9/2010 | Silvera et al. | |
| 2010/0333090 A1* | 12/2010 | Wright et al. | 717/140 |
| 2011/0161943 A1* | 6/2011 | Bellows et al. | 717/140 |
| 2013/0036409 A1* | 2/2013 | Auerbach et al. | 717/140 |

OTHER PUBLICATIONS

Auerbach et al., "A Compiler and Runtime for Heterogeneous Computing", 2012 ACM, DAC 2012, Jun. 3-7, 2012, San Francisco, California, USA, pp. 271-276; <http://dl.acm.org/results.cfm?h=1&cfid=417702354&cftoken=80698340>.*

Hormati et al., "Flextream: Adaptive Compilation of Streaming Applications for Heterogeneous Architectures", 2009 IEEE, Sep. 12-16, 2009 18th International Conference on Parallel Architectures and Compilation Techniques, pp. 214-223; <http://ieeexplore.ieee.org/stamp/stamp.jsp?tp=&arnumber=5260540>.*

Hormati et al. "Flextream: Adaptive Compilation of Streaming Applications for Heterogeneous Architectures", IEEE, 2009, 18th International Conference on Parallel Architectures and Compilation Techniques, pp. 214-223; < http://ieeexplore.ieee.org/stamp/stamp.jsp?tp=&arnumber=5260540>.

Huang et al., "Liquid Metal: Object-Oriented Programming Across the HW/SW Boundary", Springer-Verlag Berlin Heidelberg, 2008, ECOOP 2008, LNCS 5142, pp. 76-103; <http://link.springer.com/chapter/10.1007%2F978-3-540-70592-5_5#page->.

Ravi et al., "Compiler and Runtime Support for Enabling Generalized Reduction Computations on Heterogeneous Parallel Configurations", 2010 ACM, ICS'10, Jun. 2-4, 2010, Japan, pp. 137-146; <http://dl.acm.org/citation.cfm?doid=1810085.1810106>.

U.S. Office Action mailed May 23, 2013 in related U.S. Appl. No. 13/196,300.

U.S. Office Action mailed Nov. 19, 2013 in related U.S. Appl. No. 13/196,300.

Joshua Auerbach, David F. Bacon, Perry Cheng and Rodric Rabbah, "Lime: A Java-Compatible and Synthesizable Language for Heterogeneous Architectures" Reno/Tahoe, NV OOPSLA/SPLASH Oct. 17-21, 2010 pp. 89-108.

Joshua Auerbach, David F. Bacon, Perry Cheng and Rodric Rabbah, "LIME: The Liquid Metal Programming Language" Language Reference Manual, Technical Report, RC25004, IBM Research Report, May 28, 2010.

William Theis, "Language and Compiler Support for Stream Programs", PhD thesis, Massachusetts Institute of Technology, Feb. 2009.

William Theis, Michal Karczmarek and Saman P. Amarasinghe, "Streamlt: A Language for Streaming Applications", Library for Computer Science, Massachusetts Institute of Technology, Cambridge, MA, Springer-Verlag 2002.

International Search Report dated Oct. 25, 2012 received in a corresponding foreign application.

* cited by examiner

TECHNIQUE FOR COMPILING AND RUNNING HIGH-LEVEL PROGRAMS ON HETEROGENEOUS COMPUTERS

RELATED APPLICATIONS

This application is a continuation of U.S. application Ser. No. 13/196,300, filed Aug. 2, 2011.

FIELD

The present application relates generally to computers and applications, and more particularly to technique for compiling and running programs on heterogeneous computers or processors.

BACKGROUND

The mixture of computational elements that make up a computer is increasingly becoming heterogeneous. Already computers today couple a conventional processor (e.g., central processing unit (CPU)) with a graphics processor (GPU), and there is increasing interest in using the GPU for more than graphics processing because of its exceptional computational abilities at particular problems. In this way, a computer with a CPU and a GPU is heterogeneous because it offers a specialized computational element (the GPU) for computational tasks that suit its architecture, and a truly general purpose computational element (the CPU) for all other tasks (e.g., including if needed the computational tasks that are well suited for the GPU). The GPU is an example of a hardware accelerator. In addition to GPUs, other forms of hardware accelerators are gaining wider consideration, and there are already examples of accelerators in the form of field programmable gate arrays (FPGAs) and fixed-function accelerators for cryptography, XML parsing, regular expression matching, physics engines, and so on.

Programming technologies exist for CPUs, GPUs, FPGAs, and various accelerators in isolation. For example, programming languages for a GPU include OpenMP, CUDA, and OpenCL, all of which can be viewed as extensions of the C programming language. A GPU-specific compiler inputs a program written in one of these languages, and preprocesses the program to separate the GPU-specific code (hereinafter referred to as device code) from the remaining program code (hereinafter referred to as the host code). The device code is typically recognized by the presence of explicit device-specific language extensions, or compiler directives (e.g., pragma), or syntax (e.g., kernel launch with <<< . . . >>> in CUDA). The device code is further translated and compiled into device-specific machine code (hereinafter referred to as an artifact). The host code is modified as part of the compilation process to invoke the device artifact when the program executes. The device artifact may either be embedded into the host machine code, or it may exist in a repository and identified via a unique identifier that is part of the invocation process.

Programming languages and solutions for heterogeneous computers that include a FPGA are comparable to GPU programming solutions although FPGAs do not enjoy the benefits of a widely accepted C dialect yet. There are several extensions to the C language offered by the various FPGA-technology vendors, all of whom generally compile code written in their C dialect in a manner very similar to that followed by the compilers for GPUs: the compiler partitions the program into device (FPGA) code and host code, each is separately compiled, the host code is modified to invoke the device artifact.

Regardless of the heterogeneous mix of processing elements in a computer, the programming process to date is generally similar and shares the following characteristics. First, the disparate languages or dialects in which different architectures must be programmed make it hard for a single programmer or programming team to work equally well on all aspects of a project. Second, relatively little attention has been paid to co-execution, the problem of orchestrating a program execution using multiple distinct computational elements that work seamlessly together. This requires partitioning a program into tasks that can map to the computational elements, mapping or scheduling the tasks onto the computational elements, and handling the communication between computational elements which in itself requires serializing data and preparing it for transmission, routing data between processors, and receiving and deserializing data. Given the complexities associated with orchestrating the execution of a program on a heterogeneous computer, a very early static decision must be made on what will execute where, a decision that is hard and costly to revisit as a project evolves. This is exacerbated by the fact that some of the accelerators, for example, FPGAs, are difficult to program well and place a heavy engineering burden on programmers.

BRIEF SUMMARY

A method for executing one or more applications, in one aspect, may include partitioning, automatically by a program compiler, a program code into two or more logical units; and compiling each of the logical units into one or more executable entities, at least some of the logical units compiled into two or more executable entities, said two or more executable entities being different machine-specific compilations of the same logical unit.

In another aspect, a method of executing one or more applications, may include determining which one or more platforms are available for program execution; at each designated point of the program code, determining a logical unit for execution and selecting one or more executable entities that are associated with the determined logical unit and that are compatible with said one or more platforms determined to be available; and distributing said selected one or more executable entities to said respective one or more platforms determined to be available.

A system for executing one or more applications, in one aspect, may include a compiler module operable to partition a program code into two or more logical units, and compile each of the logical units into one or more executable entities. At least some of the logical units may be compiled into two or more executable entities. Said two or more executable entities may be different machine-specific compilations of the same logical unit. A runtime module may be operable to determine which one or more platforms are available for program execution. At each designated point of the program code, the runtime module may be further operable to determine a logical unit for execution. The runtime module may be further operable to select one or more executable entities that are associated with the determined logical unit and that are compatible with said one or more platforms determined to be available.

A circuit embedding instructions to be performed on a machine, the instructions including the methods described herein may be also provided.

Further features as well as the structure and operation of various embodiments are described in detail below with ref-

DETAILED DESCRIPTION

The present disclosure describes processes for compiling an application to execute on different processors, for instance, on a heterogeneous computer having two or more processors with different execution architecture, also referred to as a hybrid computer. A runtime process may be also provided that selects, distributes and executes the compiled components on the appropriate processors. A methodology of the present disclosure in one aspect may enable compiling a single-source-language for co-execution on a heterogeneous computer, and uses compilation and/or runtime techniques that address the early-partitioning and co-execution issues that arise in existing solutions. For instance, a host compiler may operate on the entire program—which may be written in a single source language—and generate machine-specific code for running the program on a general purpose CPU. In addition, any number of device-specific compilers may be allowed to also operate on the entire program, and each such compiler may elect to perform device-specific code generation independent of the choices made by the other device compilers. In this way, the methodology of the present disclosure may overcome the problem of preprocessing and partitioning a program once (into host and device codes) because it permits different compilers to compile and produce functionally equivalent machine-specific implementations of the same source code. At least one of the compilers (usually the host compiler) is guaranteed to generate code for all parts of a program. One or more compilers may generate code for subsets of the input program. For instance, since device compilers are generally more restrictive than host compilers, the device compilers might generate executables (also referred to as executable entities or artifacts) for subsets of the input program. Thus, in one embodiment of the present disclosure, multiple compilers can generate executable entities (artifacts) for an input program, and any given compiler can generate multiple executable entities (artifacts) for the same program, for example, corresponding to different partitions or subsets of the program.

In another aspect, the present disclosure also describes a technique for correlating the same program parts compiled with different compilers using a unique identifier construction that ensures that the same parts of a program, compiled with different compilers, always generate the same identifier. For example, in one embodiment of a methodology of the present disclosure, each artifact is labeled using its corresponding identifier, and placed in an artifact store organized according to the desired set of devices in the computer. The artifact store may be a repository of all artifacts produced by the various compilers. In one embodiment, an artifact is retrieved from the store using a pair of keys: one key identifies the desired device and another key identifies the unique artifact. For example, the first key identifies the desired device, and the second key is the unique artifact identifier. The order of the keys is not of importance. If the artifact exists, it is retrieved; otherwise an indication of failure is returned.

In one embodiment of the present disclosure, the artifact store is used by a runtime layer, described later in this disclosure, to dynamically partition a program. As a program executes, and at predefined events in the execution (usually dictated by the semantics of the program source language but not necessarily), the runtime may inspect the artifact store to discover the set of artifacts that implement an upcoming part of the program execution. The runtime may employ heuristics to select a new artifact to execute in lieu of the default artifact. Thus rather than execute the default host code, the runtime can dynamically load an alternate device artifact to run instead. In this way, the runtime permits many different program partitions when executing a program on a heterogeneous computer.

Figure 1:
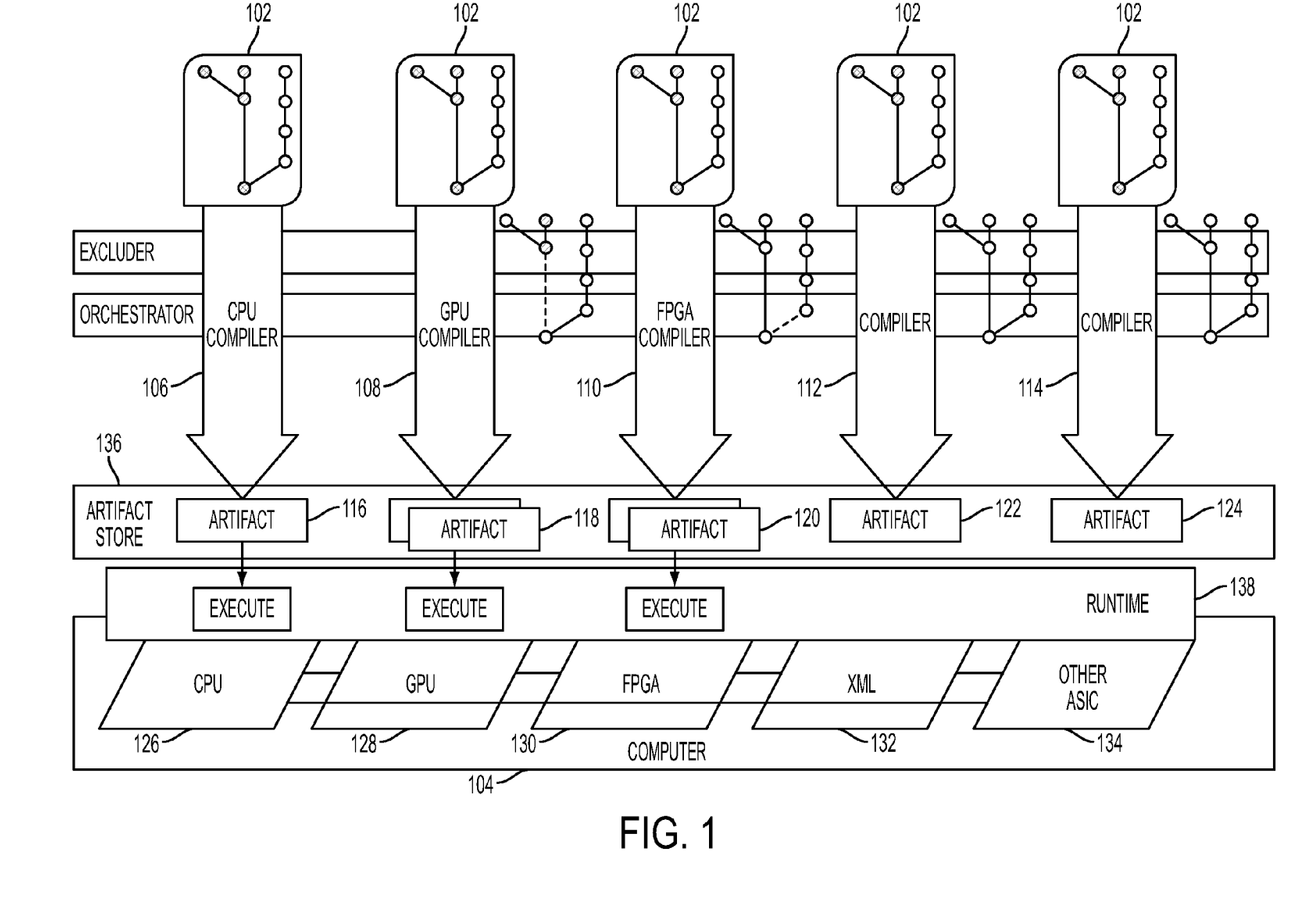
FIG. 1 is a diagram illustrating the compiler and runtime methodology of the present disclosure in one embodiment.

FIG. 1 illustrates a compiler and runtime methodology of the present disclosure in one embodiment with an example software/hardware configuration. A compilation technique of the present disclosure in one embodiment compiles a single-source-language 102, for instance, for co-execution, on a heterogeneous computer 104. An example hybrid computer 104 shown includes a number of different types of processors, a CPU 126, a GPU 128, a FPGA 130, an XML 132 and another application specific integrated circuit (ASIC) 134. A host compiler 106 may generate an executable code or entity 116 that is compatible to run on a CPU 104. In addition, a GPU compiler 108 may operate on the same source code 102 and generate an executable entity or code 118 compatible to run on the GPU 128; a FPGA compiler 110 may operate on the same source code 102 and generate an executable entity or code 120 compatible to run on the FPGA 130; an XML compiler 112 may operate on the same source code 102 and generate an executable entity or code 122 compatible to run on the XML processor 132; another compiler 114 may operate on the same source code 102 and generate an executable entity or code 124 compatible to run on another special processor or application specific integrated circuit (ASIC).

At least one of the compilers (usually the host compiler, e.g., 106) is guaranteed to generate code for all parts of a program 102. One or more compilers may generate code for subsets of the input program 102. Thus, in one embodiment of the present disclosure, multiple compilers 106, 108, 110, 112, 114 can generate executable entities (artifacts) 116, 118, 120, 122, 124 for an input program 102, and any given compiler can generate multiple executable entities (artifacts) for the same program, for example, corresponding to different partitions or subsets of the program. The generated executable entities 116, 118, 120, 122, 124 may be stored in an artifact store 136, for example as a database or in another format, in memory and/or a persistent or permanent storage device. During runtime (e.g., when the program is being run or executed on the computer 104), a runtime environment 138 determines the types of processors 126, 128, 130, 132, 134 that are available on the computer 104 for running a program and selects and executes one or more executable entities from the artifact store 136, based on the availability of the processors on the computer 104. Thus, depending on the computer's processor configuration, different executable entities may be selected, and distributed and run on the appropriate processors.

Figure 2:
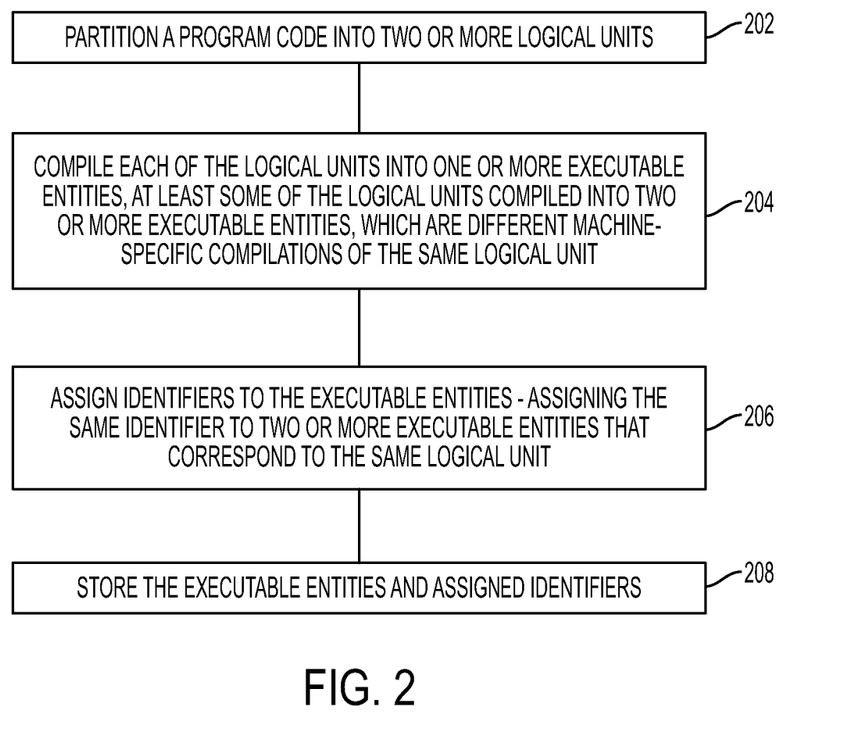
FIG. 2 is a flow diagram illustrating a compiler method in one embodiment of the present disclosure.

FIG. 2 is a flow diagram illustrating a compiler method in one embodiment of the present disclosure. At 202, a compiler partitions a program code into two or more logical units. At 204, the compiler compiles each of the logical units into one or more executable entities. At least some of the logical units may be compiled into two or more executable entities, which are different machine-specific compilations of the same logical unit. At 206, the executable entities may be assigned corresponding identifiers. One or more executable entities corresponding to each logical unit is assigned a unique identifier. Thus, two or more executable entities that correspond to the same logical unit are assigned the same identifier. In one embodiment, each executable entity may be identified with a tuple, e.g., a unique identifier that corresponds to a logical unit, and an identifier that identifies a specific processor (or device) on which the executable entity can be executed. In that way, two or more executable entities corresponding to the same logical unit that share the unique identifier can be distinguished from one another by the device identifier. At 208, the executable entities may be stored with the corresponding identifiers, for example, in persistent storage.

Figure 3:
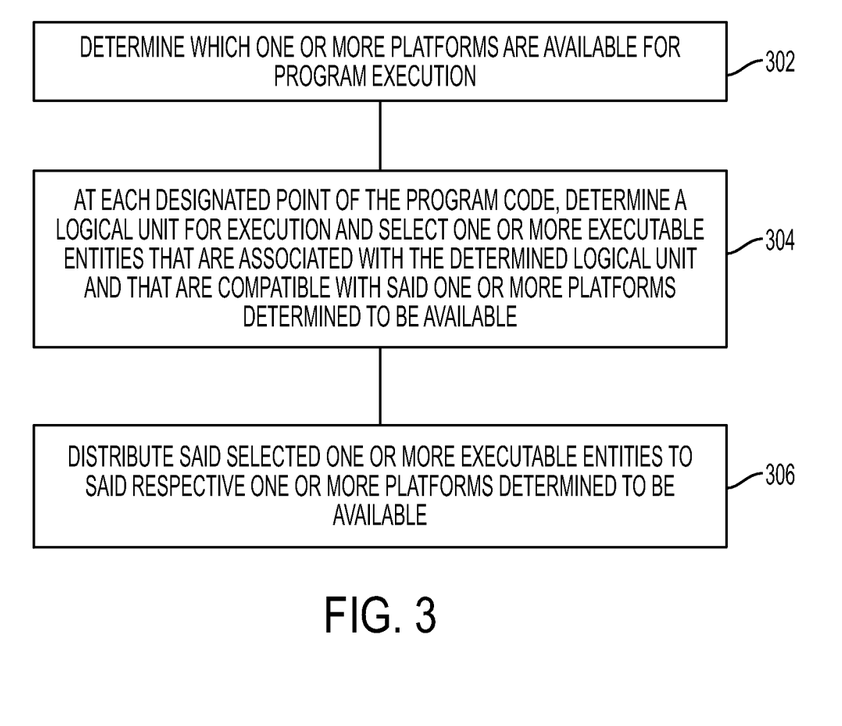
FIG. 3 is a flow diagram illustrating a runtime method in one embodiment of the present disclosure.

FIG. 3 is a flow diagram illustrating a runtime method in one embodiment of the present disclosure. At 302, a determination is made as to which one or more platforms are available for program execution on a computer. At 306, at each designated point of the program code, a logical unit is determined for execution. One or more executable entities are selected which are associated with the determined logical unit and which are compatible with said one or more platforms determined to be available. At 308, selected one or more executable entities may be distributed to the respective one or more platforms determined to be available.

In the present disclosure in one embodiment, a comprehensive compiler infrastructure and runtime system may be provided that together enable the use of a single language for programming computing systems with heterogeneous accelerators or the like, and the co-execution of the resultant programs on such architectures. In one aspect, a design feature of the present disclosure may make it possible to have the same semantics when executing on any processor, whether sequential or thread-parallel (like a multicore CPU), vector-parallel (like a GPU), or bit-parallel (like an FPGA).

In one embodiment, a compiler of the present disclosure may first translate the program into an intermediate representation that describes the computation as independent but interconnected computational nodes or logical units. For instance, referring back to FIG. 1, a source program 102 may be partitioned into those computational nodes (e.g., 140), also referred to as logical units as shown at 102.

The compiler of the present disclosure may then give a series of quasi-independent backend compilers a chance to compile one or more groups of computational nodes for different target architectures. Most backend compilers are under no obligation to compile everything. However, in one embodiment, one backend is always dedicated to compiling the entire program and guaranteeing that every node has at least one implementation.

The result of a compilation with a methodology of the present disclosure in one embodiment is a collection of artifacts for different architectures, each labeled with the particular computational node that it implements. The runtime then has available to it a large number of functionally equivalent configurations depending on which nodes are activated.

In one embodiment of the present disclosure, a dynamic partitioning of a program is performed for co-execution, for instance, using heuristics. The compiler of the present disclosure may solve the problem of a premature static partitioning of an application with dynamic partitioning of the program across available processing elements, e.g., targeting multicore CPUs, GPUs, and FPGAs. The advantage of doing the partitioning at runtime is that it need not be permanent, and it may adapt to changes in the program workloads, program phase changes, availability of resources, and other fine-grained dynamic features.

The compilation framework and runtime disclosed in the present application may provide the following features, but not limited to only those.

One source-multiple architectures: the same set of logical units can be compiled separately into executable artifacts using architecture-specific compilers thus allowing for the possibility of writing code, for example, in a Java™-like language and realizing native executables for accelerators or like processors.

Automatic compilation to special-purpose processors such as GPU, FPGA and others: for instance, the compilation framework of the present disclosure in one embodiment may be capable of generating Java™ bytecode, OpenCL code for execution on GPUs, and Verilog code for execution on FPGAs.

Managed runtime for stream-computing: the compilation framework of the present disclosure in one embodiment may provide a language runtime implemented entirely in one language, for example, Java™ or the like, and may be capable of being hosted by a virtual machine, for example, any Java™ virtual machine (VM); it may schedule the execution of the logical units using native concurrency mechanisms to exploit parallelism when it exists in the program. Logical units in this disclosure are also referred to as tasks. A task graph in the present disclosure refers to a network of connected tasks, for instance, by their inputs and outputs. For example, task 1 may be connected to task 2 as a result of task 1's output being used by task 2's input.4. Flexible configuration for co-execution: the compilation framework of the present disclosure in one embodiment may orchestrate the co-execution of logical units between different processors, for example, Java™ VM, GPU and FPGA, and/or others, when such artifacts exist, including the management of communication as well as serialization and de-serialization of data for artifacts.

Figure 4:
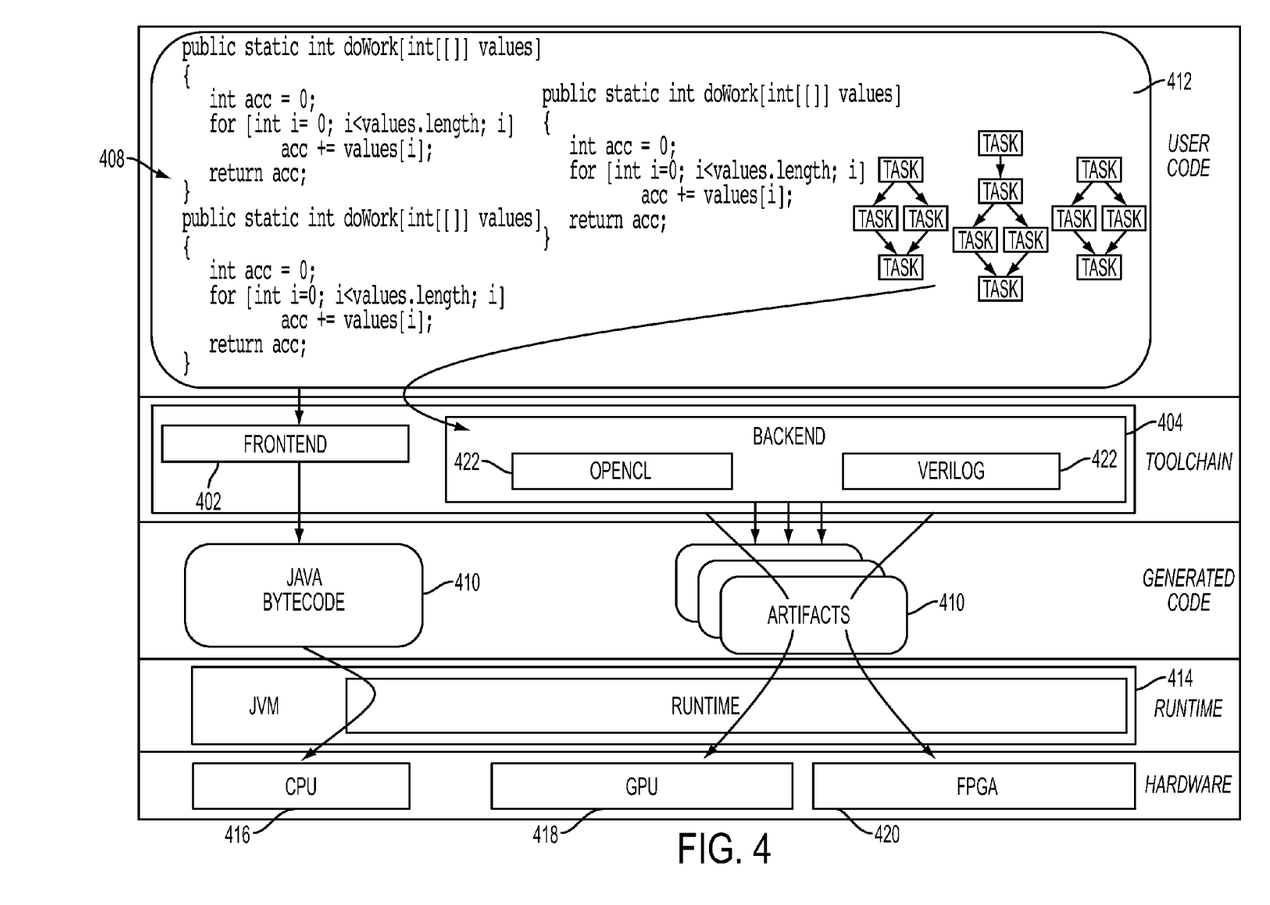
FIG. 4 is an example architectural overview of the compilation and runtime architecture of the present disclosure in one embodiment.

FIG. 4 is an example architectural overview of the compilation and runtime architecture of the present disclosure in one embodiment. The architecture may be organized into a frontend (FE) compiler 402 and a set of architecture-specific backend (BE) compilers 404 for special processors such as GPUs and FPGAs. The framework (e.g., a user interface module of the framework) accepts a set of source files 408 and produces artifacts 410 for execution. An artifact is an executable entity that may correspond to either the entire program (e.g., as is the case with the bytecode generation) or its subsets (e.g., as is the case with the OpenCL/GPU and Verilog/FPGA backends). An artifact is packaged in such a way that it can be replaced at runtime with another artifact that is its semantic equivalent.

The architecture shown in FIG. 4 illustrates a Java™ bytecode compiler as a general purpose compiler for general purpose CPUs, and OpenCL and Verilog as backend compilers for GPUs and FPGAs respectively. Those components are shown only as examples. It should be noted that the methodologies and the framework of the present disclosure is not limited to only that configuration shown in FIG. 4. Rather, the operations and workings described in the present disclosure may apply to other general purpose and special purpose processors and compilers. In addition, as an example, a Java™-like programming language and its syntax and commands are described below as a language used in programming a single-source program that can be compiled with the compiler framework of the present disclosure. However, the methodologies of the present disclosure need not be limited to a program programmed using only that language or any one single language.

Referring to FIG. 4, an example single-source language 408 may expose logical units in the form of task-graphs 412. A task applies a function repeatedly as long as data items are presented as input to the task. Task-graphs result from connecting tasks together so that the output of one becomes the input to another.

An implementation of the frontend compiler 402 may include a Bytecode compiler. For instance, the frontend compiler 402 may include a Java™-compatible language and may be built via an incremental modification to the existing robust Java™ compiler that is built into Eclipse (ECJ). The Eclipse compiler (and transitively the FE 402) may perform shallow optimizations. Internally, the Eclipse compiler may use the abstract syntax tree (AST) as the program representation throughout. The FE 402 may implement the language features via AST-to-AST rewriting and reuse the existing Eclipse bytecode generation phase.

In one embodiment, a component in the FE 402 may be applied to the AST to just before bytecode generation to convert the AST into an intermediate representation suitable for the backends 404. The component may perform an interpretive execution of portions of the program 408 that build task graphs, with the goal of statically discovering the structure of many task graphs 412 that the program will create at runtime (including their topology and the code of each node after inlining, constant propagation, and other optimizations). Interpretive execution may not discover all possible task graphs that the program might build.

The various backends 404 may be individually allowed to compile the tasks that make up these graphs. Each backend may have an excluder component that examines each task to decide whether its methods can be compiled; a task containing methods with language constructs that are not suitable for the backend is excluded from further compilation by that backend and no artifact is produced for it. Otherwise, the backend produces an artifact 410 for each task that it compiles. A backend may produce artifacts for what were, in the original program, individual tasks. Alternatively, a backend may produce artifacts 410 for aggregations of contiguous tasks, for example, an entire pipeline (i.e., sequence of connected tasks) or at least the largest subsection of a pipeline possible given that some tasks may be rejected by the excluder.

In one embodiment of the present disclosure, the frontend and backend compilers 402, 404 cooperate to produce a manifest describing each generated artifact and labeling it with a unique task identifier. The set of manifests and artifacts 410 are used by the runtime 414 in determining which task implementations are semantically equivalent to each other. The same task identifiers are incorporated into the final phase of bytecode compilation so that the task construction and graph construction expressions in the program can pass along these identifiers to the runtime 414 when the program is executed. An individual task may have more than one task identifier since it may be part of larger aggregate tasks produced by one or more backends 404. However, the task identifiers are generated in such a way that the tasks (whether simple or aggregate) with the same task identifier are functionally equivalent.

An example of a special processor that could make up a hybrid computer is a GPU 418. In this example, the backend for GPUs may produce OpenCL code that is automatically compiled to native object code using platform specific OpenCL runtime compilers. The generation of OpenCL code confers the added benefit of running the code 408 natively on a variety of platforms that provide OpenCL implementations. As an example, the framework of the present disclosure in one embodiment may treat OpenCL as a portable "assembly" language for uniprocessors, GPUs and multicore processors.

The OpenCL backend 422 may generate artifacts 410 for either individual tasks or connected task graphs. It may compile each task to an OpenCL kernel, perform scheduling of tasks as well as manage inter-task data transfer. The communication between the different kernels may be optimized so that data remain resident in the GPU device memory between subsequent runs of connected tasks. This may avoid needless data-transfers between the host CPU and the GPU, thus maximizing performance.

Parallelism may exist explicitly in the task graph (e.g., via an explicit command in a program) or indirectly expressed by the programmer in a more imperative style (e.g., as a collective operation such as map or apply). When a piece of parallel code is extracted, it may be turned internally by a backend compiler 404, e.g., OpenCL backend 422, into a loop that maps directly to the index space associated with the OpenCL parallel execution model. The generated OpenCL code can adapt to any input size and any number of threads executing on the device. This contrasts with hand-written code that often assumes a fixed number of threads or a fixed input size. Thus, the generated code is more generic and flexible than the hand-written one.

For getting good performance on the GPU 418, the compiler framework of the present disclosure may carefully map data to different memories. Generally, four types of memories are available in the OpenCL programming model: global, constant, local and private memory. These are ordered from the slowest and largest (global memory) to the fastest and smallest (private memory) and reside on the GPU device board. The global memory can be accessed for read/write by all the threads running on the device. This is comparable to the main memory (RAM) of the CPU. The constant memory can be viewed as a small read-only global memory that is being used mainly to store program constants. The local memory is a read/write memory shared among all the threads running on the same compute unit (similar to a shared level2 cache in a multicore processor). Finally, the private memory is dedicated to each thread and cannot be used to exchange data between threads. The backend 404 (e.g., 422) may automatically optimize the placement of the data in the different memories and perform adequate program transformations to ensure best performance. For instance, loop tiling may be applied to parallel loops and the local memory may be used as a scratchpad memory to minimize the traffic to the global memory. Another optimization may include detecting redundant loads from the global memory and eliminating them by storing the value in the fast private memory. Other optimizations may be performed for a GPU 418.

Another example of a process that could make up a hybrid computer is a FPGA 420. In this example, the FPGA backend 424 may operate on task graphs and can generate Verilog code for pipelines and other explicitly specified program commands for parallelism. Briefly, Verilog is a hardware description language. The backend compiler 404 of the present disclosure in one embodiment having the FPGA 424 may support tasks that operate on primitive data types, and excludes task with unbounded array allocations, although bounded array allocations are allowed. In one aspect, the code generation strategy is a dual approach, coarse-grained pipeline parallelism as expressed in the task graph, and fine-grained instruction level parallelism available in the task method. The backend compiler 424 performs static work estimation using a model to determine bottleneck tasks, and then attempts to aggressively partition its worker method into very fine-grained blocks; as fined grained as a single operation. The backend for FPGA 424 may include optimizations. The backend 424 may use a library of pre-generated hardware blocks, including communication firmware to transport data between the CPU 416 and the FPGA 420. The backend 424 may automatically perform logic synthesis of the generated Verilog to a produce a bitfile (which is used to configure the FPGA before running the program). This step does not require any user intervention and may use vendor-specific EDA (electronic design automation) tools. As an example, PCIe-based Xilinx FPGAs may be supported. Other FPGAs may be also supported.

A runtime component in the present disclosure enables execution of compiled codes (executable entities or artifacts) on appropriate hardware or processors. As an example, a runtime module 414 may be implemented in Java™ and may be capable of being hosted by any JVM. In one embodiment of the present disclosure, a runtime module 414 may include one or more virtual machines or the like for executing one or more executable entities. It may construct task graphs at run time, elect which implementations of a task to use from among the available artifacts 410, perform task scheduling, and if needed or desired, orchestrate marshaling and communication with native artifacts. In one embodiment of the present disclosure, the runtime module 414 may include phases of execution for performing those tasks, e.g., reifying task graphs, scheduling and running a task graph, task substitutions, and native connections and marshaling.

In one embodiment of the implementation of the runtime module 414, the runtime 414 may contain a class for every distinct kind of task that can arise, for example, in a programming language used to program a single source program 408. When a bytecode compiler produces the code for a task, it generates an object allocation for one of these runtime classes directly, or generates a class that subclasses the appropriate runtime class, adding tailored behavior, and then generates an object allocation for the generated class.

A connect operation which joins the output of one task to the input of another generates a method call on runtime-provided methods that cause the connection to be formed. The result of this reification strategy is that, when the program executes, the task creation and connection operators of the language are reflected in an actual graph of runtime objects. The generated bytecode that instantiates a task also provides the runtime with the unique identifiers that were generated by the backend compilers 404 to advertise the set of available task artifacts.

In one embodiment, scheduling and running an executable entity may occur as follows. A "start" method, when called on any task graph, activates the scheduling portion of the runtime. The reified graph is explored to find the tasks that make up the graph, and to compute the rates of each task. "Rate" refers to the number of outputs produced for each input. Tasks made from user-methods have a rate of 1:1, while builtin tasks can have other rates which may be statically known (though not necessarily 1:1), or it may be dynamically varying.

Once the rates of all the tasks are known, the graph is divided by the scheduler into synchronous regions such that either (1) all tasks in a synchronous region have statically known rates or (2) the synchronous region has a single task with dynamically varying rate. For each synchronous region of the first kind, a static schedule is calculated which will cause each task to be executed the right number of times to keep the rates of the tasks in balance. The connections between tasks in a synchronous region, therefore, need not have elastic buffers; however, those that connect synchronous regions have such buffers to accommodate the varying rates.

Assuming that the tasks in the graph only have bytecode artifacts, the runtime creates a thread for each synchronous region. These threads will block on the incoming connections of the region until enough data is available for a single iteration of the region's schedule, producing data on its outgoing connections. The creation and starting of these threads completes the runtime's implementation of the start( ) operation.

In one embodiment, task substitution (i.e., dynamic program partitioning between processors in the computer) may be performed as follows. If tasks in the graph have non-bytecode artifacts, the runtime learns of this while examining the reified task graph since the unique identifiers of tasks that are stored there can be looked up efficiently in the artifact store (see e.g., FIG. 1, 136) populated by the backends 404. For each task or contiguous sequence of tasks that has an alternative implementation (e.g., more than one executable entity available), the runtime may be in a position to realize a substitution. In one embodiment, a runtime algorithm may use one or more rules for performing a substitution automatically. For instance, a rule may specify to prefer a larger substitution (subsuming a larger number of contiguous tasks) to a smaller one. Another rule may specify to favor GPU and FPGA artifacts to bytecodes. The choices may be manually directed as well. A more sophisticated algorithm that accounts for communication costs, performs dynamic migration, or runtime adaptation or others may be considered. Realizing the actual substitution involves the native connection and marshaling described below. Substitution may precede the creation and starting of threads as described above, but otherwise does not generally affect the rest of the runtime.

In one embodiment, native connections and marshaling may be performed as follows. Characteristic of all non-bytecode artifacts may be that there is some unique kind of connection between the domain of the JVM and the hardware domain of the backend. For example, GPU coexecution alongside the JVM requires first loading the native binary (a one-time occurrence), currently in the form of dynamically-linked library, and performing Java™ Native Interface (JNI) calls to transfer data from the JVM to the GPU. Similarly, in the case of the FPGA, the device itself is programmed using a bitfile, and also loading a library to handle the native communication with the FPGA device driver. In all cases, some serialization and de-serialization of data may occur. Technically, JNI supports passing Java™ data structures by reference, with callbacks to access individual fields and dependent objects. In practice, serialization of data may be utilized to avoid large numbers of JNI crossings. Briefly, JNI allows Java™ running in a JVM to call and be called by native programs specific to a hardware or operating system.

In order to mitigate the latency of most native connections, some buffering on the connection may be created and used. Thus, the presence of a native task in the midst of tasks running Java™ bytecodes may break the synchronous region, placing the native task in a native region that is similarly separated in terms of thread scheduling. Whereas synchronous regions in the JVM may be separated by simple data queues, the queuing between native regions may be buried at least in part in native code and the details may vary according to the type of backend.

As an example, a single language supported by the compiler framework and runtime system of the present disclosure may be a Java™-like language. Such language may be designed to have the requisite semantics to allow concise programming of and efficient compilation to highly diverse architectures. The language may offer a task-based dataflow programming model that allows for program partitioning at task-granularity. A task can be strongly isolated such that it probably cannot access mutable global program state, and no external references to the task exist so that its state cannot be mutated except from within the task, if at all. Task-graphs result from connecting tasks together so that the output of one becomes the input to another. Only value types may be permitted to flow between tasks along their connections. Value types represent immutable objects and thus task-isolation cannot be violated. The language may guarantee isolation and immutability to make it ideal to perform dynamic program partitioning and mapping of task-graphs to heterogeneous architectures for co-execution. Such programming language in one embodiment may augment Java™ with a number of features designed to expose parallelism. An example single programming language that includes features that could be used to program various different types of processors can be found in Joshua Auerbach and David F. Bacon and Perry Cheng and Rodric Rabbah, Lime: a Java-compatible and synthesizable language for heterogeneous architectures in OOPSLA, 2010; and also in Joshua Auerbach and David F. Bacon and Perry Cheng and Rodric Rabbah, LIME: The Liquid Metal Programming Language—Language Reference Manual, Technical report, RC25004, IBM Research, 2010. See http://domino.research.ibm.com/library/cyberdig.nsf. More details of StreamIt can be found in Thies, William. *Language and compiler support for stream programs*. PhD thesis, Massachusetts Institute of Technology, 2009; and in Thies, William and Karczmarek, Michal and Amarasinghe, Saman P. StreamIt: A Language for Streaming Applications. CC, 2002.

It should be noted that the compiler and runtime methodologies and framework of the present disclosure are not limited to using a particular language. Rather, the above-description of the language is provided as an example only.

Figure 5:
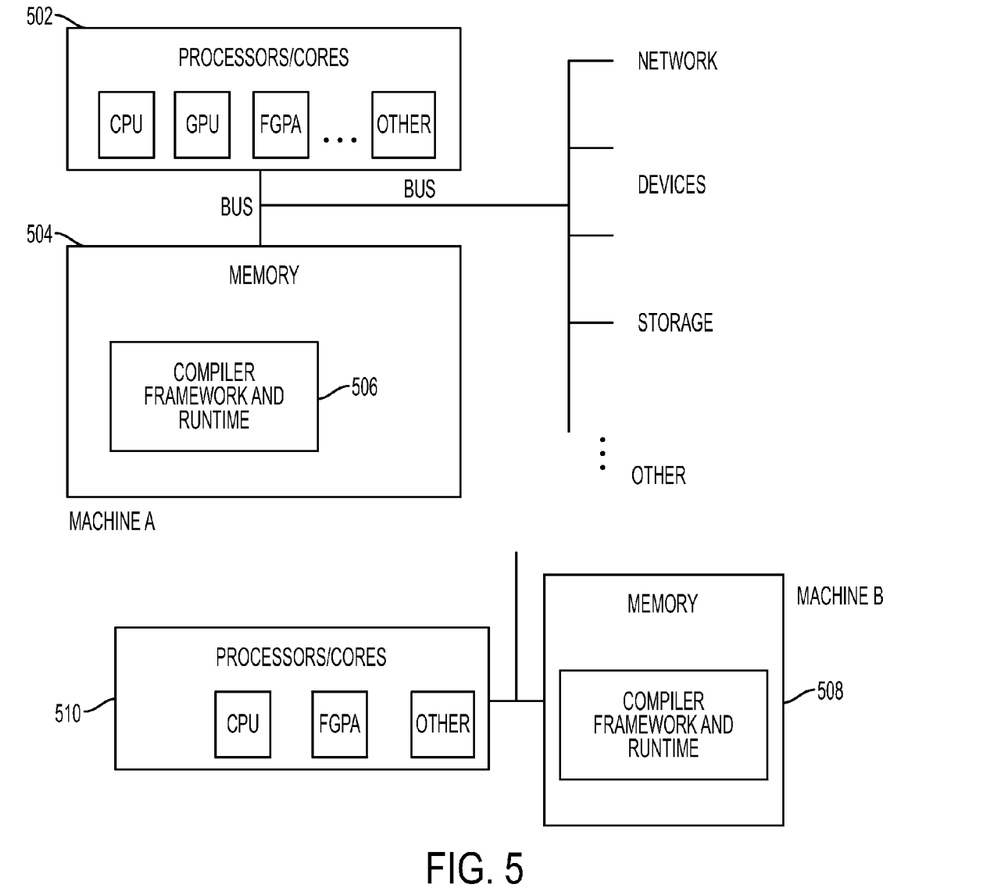
FIG. 5 shows example systems on which the compiler framework and/or runtime system can operate, in one embodiment of the present disclosure.

FIG. 5 shows example systems on which the compiler framework and/or runtime system can operate, in one embodiment of the present disclosure. Such system may include one or more processors 502, memory 504, and may have connections to network, storage and other devices. A compiler framework and runtime system 506 of the present disclosure may reside in computer memory 504 and executed by the processor(s) 502. For instance, the compiler framework and runtime system 506 may be loaded from a persistent storage device, and/or loaded from a network. A program may be compiled by the compiler of the present disclosure as described above. The resulting executable entities may be stored and/or executed by the runtime system 506 of the present disclosure as described above. It is noted that a program need not be compiled and executed on the same machine. That is, for example, a program may be compiled using the compiler framework of the present disclosure on one machine, and the stored executable entities ported to another machine for execution on that machine by the runtime system of the present disclosure. As an example, FIG. 5 shows machine A and machine B, which may have different processor configurations. A program may be compiled in machine B, using machine B's processor 510 and memory 508, then run on machine A, and vice versa. The configurations of the computers in FIG. 5 are shown as examples only; the methodologies of the present disclosure may apply to any other configurations.

In this disclosure, a compiler infrastructure and runtime system that together enable the use of a single language for programming computing systems with heterogeneous accelerators (e.g., with a mixture of conventional CPU cores, GPUs, and FPGAs), and the co-execution of the resultant programs on such architectures was described above. By way of an example, a Java™-compatible language was described, with the framework that leverages an existing Java™ compiler and exposes several applicable compilation techniques, which include, but not limited to, (1) interpretive execution of dynamic graph construction expressions to statically discover the structure and code of the resulting graph and (2) a multi-versioning strategy that redundantly compiles for multiple backends, excluding code that cannot readily be compiled for a given one. The runtime module is enabled to select a partitioning optimized for the computational elements.

While programming technologies exist for CPUs, GPUs, FPGAs, and various accelerators in isolation, they are disparate languages or dialects in which different architectures need to be programmed. On the other hand, the methodologies of the present disclosure in one embodiment allow for a single program for programming different processors. In addition, the methodologies of the present disclosure allow for co-execution, including orchestrating a program into distinct computational elements that execute on different architectures and work seamlessly together. Furthermore, the methodologies of the present disclosure allow for dynamic and automatic decisions to be made in determining on what will execute where.

In one embodiment, the methodologies and/or one or more components of the present disclosure may be implemented and executed on field-programmable gate array (FPGA), graphical processing unit (GPU), or other special purpose processor or circuit, or a central processing unit (CPU), or any combinations thereof. Language such as hardware description language (HDL) may be used to program such hardware or integrated circuit. In one embodiment of the present disclosure, for example, the main logic of the program may run on an FPGA, while subsidiary logic of the program run on a CPU.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory circuit having machine instructions to perform a method of executing one or more applications, the method comprising:
   partitioning a program code into two or more logical units; and
   compiling each of the logical units into one or more executable entities, at least some of the logical units compiled into two or more executable entities, said two or more executable entities being different machine-specific compilations of the same logical unit,
   wherein the compiling further comprises inputting logical units to different machine-specific compilers to produce said two or more executable entities; and
   assigning same identifier to all executable entities compiled from the same logical unit,
   wherein the one or more executable entities are stored with at least two keys, one key identifying a logical unit from which said one or more executables are compiled, and another key identifying a platform with which said one or more executable entities are compatible.

2. The non-transitory circuit of claim 1, wherein the logical units are compiled for two or more combinations of general purpose computing platform, a specialized computing platform, or a reconfigurable computing platform.

3. The non-transitory circuit of claim 2, wherein a main program of the logical units is executed on a field programmable gate array and a subsidiary program of the logical units is executed on a central processing unit.

4. The non-transitory circuit of claim 1, wherein the method further includes:
   determining which one or more platforms are available for program execution; and
   at each designated point of the program code, determining a logical unit for execution and selecting one or more executable entities that are associated with the determined logical unit and that are compatible with said one or more platforms determined to be available.

5. The non-transitory circuit of claim 4, wherein the method further includes distributing said selected one or more executable entities to said respective one or more platforms determined to be available.

6. A system for executing one or more applications, comprising:
   a hardware processor;
   a compiler module operable to execute on the hardware processor and further operable to partition a program code into two or more logical units, and compile each of the logical units into one or more executable entities, at least some of the logical units compiled into two or more executable entities, said two or more executable entities being different machine-specific compilations of the same logical unit; and
   a runtime module operable to execute on the hardware processor and further operable to determine which one or more platforms are available for program execution, and at each designated point of the program code, operable to determine a logical unit for execution and select one or more executable entities that are associated with the determined logical unit and that are compatible with said one or more platforms determined to be available, said two or more executable entities generated based on compiling the program code comprising said logical units, wherein said one or more executable entities include at least two keys, one key identifying the logical unit from which said one or more executables are compiled, and another key identifying a platform with which said one or more executable entities are compatible.

7. The system of claim 6, wherein the compiler module is further operable to assign same identifier to all executable entities compiled from the same logical unit.

8. The system of claim 6, wherein the runtime module is further operable to distribute said selected one or more executable entities to said respective one or more platforms determined to be available.

9. The system of claim 6, wherein the logical units are compiled as executables on two or more combinations of general purpose computing platform, a specialized computing platform, or a reconfigurable computing platform.

10. The system of claim 6, wherein an executable entity is generated for all parts of the program for at least one specific machine.

\* \* \* \* \*